May 9, 1939.　　　　W. SCHNEIDER　　　　2,157,576

ARRANGEMENT OF OSCILLATION CRYSTALS

Filed June 18, 1937

INVENTOR
WILHELM SCHNEIDER
BY
ATTORNEY

Patented May 9, 1939

2,157,576

UNITED STATES PATENT OFFICE 2,157,576

ARRANGEMENT OF OSCILLATION CRYSTALS

Wilhelm Schneider, Berlin, Germany, assignor to Telefunken Gesellschaft für Drahtlose Telegraphie m. b. H., Berlin, Germany, a corporation of Germany Application June 18, 1937, Serial No. 148,970
In Germany May 14, 1936

8 Claims. (Cl. 250—36)

This invention relates to an improved crystal oscillation generator arrangement.

In order to maintain constant the frequency produced by an oscillation generator (transmitter) it is known to employ as control means primarily piezo-electric crystals which are connected with the self-excited control stage, and mostly inserted in the grid circuit of the oscillation tube. In order to exclude variations in the frequency caused by temperature variations, the oscillation crystals are placed in a container whose temperature is maintained constant by a thermostat arrangement. If it is required that the wave of a transmitter is to be frequently changed, a corresponding number of oscillation crystals must be held in readiness. In order that the wave change can be quickly carried out, it is advisable to mount all crystals in the transmitter, and to put into service the respectively needed crystals by means of a switch. This involves, however, considerable construction difficulties, since the lengths of the connection lines must not only be as short as possible, but should also be the same for all crystals. The conditions become especially complicated where several crystals are contained in a thermostatically temperature controlled casing. The invention solves this problem in an especially favorable manner.

In accordance with the invention, the oscillation crystals within a thermostatically temperature controlled container are disposed along a circle, and they are connected by means of a switch, to a line starting from the center of said circle or passing therethrough, and leading to the oscillation tube. An especially simple structure is obtained when the crystal container has a ring shape, and the oscillation tube including the adjoining switch organs is accommodated within the opening through the ring.

Figure 1:
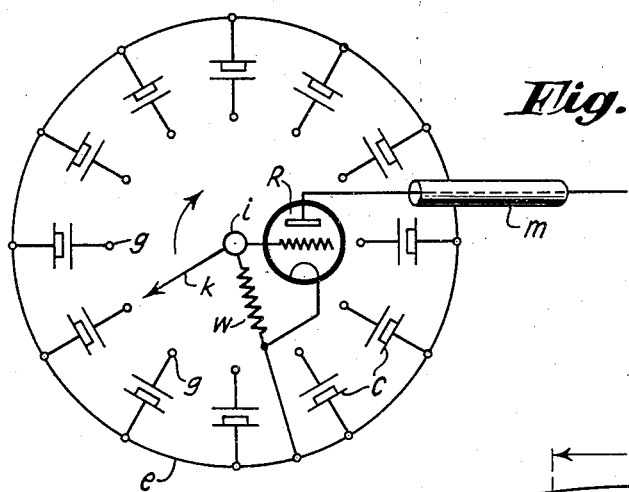
Figure 2:
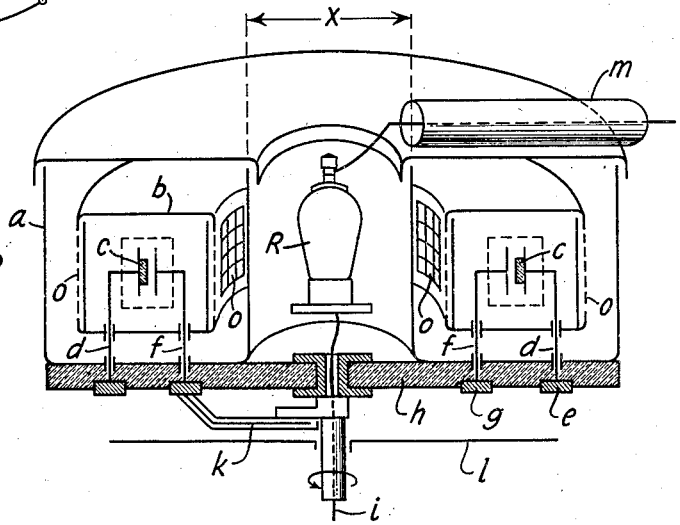
Figure 3:
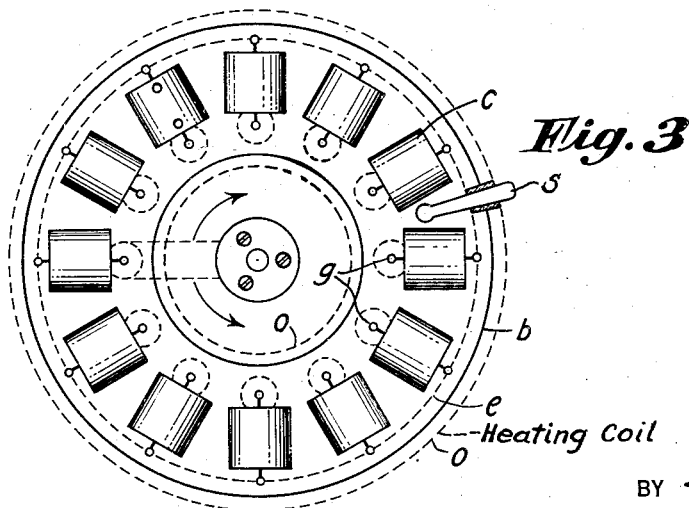

Possible constructions according to the invention are shown in three figures of the drawing in which Fig. 1 shows the circuit and the arrangement diagrammatically and Figs. 2 and 3 show the arrangement structurally.

Fig. 1 shows the principal arrangement. A number of oscillatory crystal units $c$ such as 12, for instance, including the appertaining electrodes, are arranged in a circle. Each electrode is connected to an annular line $e$ and from the other electrodes, lines are laid out connecting the contacts $g$ which by means of a contact arm $k$ can be connected selectively to a centrally situated line $i$. The further circuit of the oscillation stage consists, for instance, of a tube $R$ whose control grid is connected across a resistor $W$ to the cathode to which the desired crystal is connected in parallel. The anode is connected by means of a line shielded by a metal tubing $m$ to the coupling impedance for the following stage, and to the plate voltage source. Under the given conditions, the tube operates in a circuit for generating oscillations with vacuum tubes as described by an invention of Huth and Kuhn in German Pat. #310,152, patented Sept. 28, 1917, but obviously also any other circuit suited for exciting the crystal oscillation may be employed.

Fig. 2 shows further particulars as regards construction. The crystals $c$ each being arranged within a special capsule (shown in dash lines) are situated in a ring-shaped toroid container $b$ equipped at the inside or outside with a heating winding $o$. The ring-shaped container $b$ is enclosed in a similar ring-shaped vessel $a$ whereby a more favorable heat insulation, and a small thermal action of the outside temperature upon the crystal arrangement are obtained. The two containers, or at least the one consists preferably of metal, or insulating material metallized on the surface, thus acting at the same time as a shield. The crystal containers are supported by an insulating plate $h$. The latter holds in grooves the metal ring $e$ to which one electrode of each of the crystals is connected by lines $d$. The ring $e$ is connected to the cathode of the oscillation tube. The other crystal electrodes are connected to the contact knobs $g$ by means of connections $f$ passed through both containers and insulated therefrom. In the insulating plate $h$ a plate $l$ is mounted which carries a contact arm $k$ which glides over the contact knobs $g$. The diameter $x$ of the opening of the outer container $a$ is suitably chosen wide enough to accommodate therein the oscillation tube R and eventually also further circuit organs, such as, for instance, the resistor W, shown in Fig. 1. The anode supply line to the tube R is passed through the shielding tube $m$. As can be readily seen, the leads from the crystal electrodes to the grid of tube R not only are very short, but have also the same length for all crystals. Furthermore, the stray capacities for all crystals have the same value. The shaft $i$ may also carry a dial disk $l$ or a pointer indicating the crystal which happens to be in operation.

Fig. 3 again shows the inner container $b$ with the crystal units $c$. A contact thermometer $s$ projects into the container automatically closing or opening the current passing through the heating winding o in a manner known as such and in accordance as to whether the desired temperature has been exceeded, or has not as yet been reached.

What is claimed is:

1. An oscillating crystal arrangement comprising a casing having a central opening therein, an electron discharge device located within said central opening, a plurality of piezo-electric crystals within said casing, and means external of said casing for connecting in electrical circuit said electron discharge device and at least one of said crystals.

2. An oscillation crystal arrangement comprising a casing having a central opening therein, an electron discharge device located within said central opening, a ring-shaped container within said casing, a plurality of piezo-electric crystals within said ring-shaped container, and means external of said casing for connecting in electrical circuit said electron discharge device and at least one of said crystals.

3. An oscillation crystal arrangement comprising a casing having a central opening therein, a plurality of piezo-electric crystals arranged in a circle within said casing, an electron discharge device located within said central opening, a commutator switching device for connecting in electrical circuit at least one of said crystals with said electron discharge device, and means for thermostatically controlling the temperature within said casing.

4. An oscillation crystal arrangement comprising a plurality of piezo-electric crystals arranged in a circle, an electron discharge device located in the center of said circle, and switching means for electrically connecting at least one of said crystals in circuit with said electron discharge device.

5. An oscillation crystal arrangement comprising a casing having a central opening therein, an electron discharge device located within said central opening, a plurality of piezo-electric crystals within said casing, an insulating base for said casing, a continuous ring secured to said base, said ring being connected to one side of each crystal, and a plurality of separate switch contacts connected to the other side of said crystals, and a switch arm to bridge said ring and at least one of said contacts to externally connect in electrical circuit said electron discharge device and at least one of said crystals.

6. An oscillation crystal arrangement comprising a casing having a central opening therein, an electron discharge device having an anode, grid and cathode located within said central opening, a plurality of piezo-electric crystals within said casing, an insulating base for said casing, a continuous ring secured to said base, said ring being connected to one side of each crystal, a plurality of separate switch contacts connected to the other side of said crystals, a switch arm to bridge said ring and at least one of said contacts to externally connect in electrical circuit the grid of said electron discharge device, and a series resistance connected from said grid to the cathode of said electron discharge and said continuous ring.

7. An oscillation crystal arrangement comprising an insulated casing, heating means within said casing, an electron discharge device located in the central portion of said casing, a ring-shaped metallic container within said casing, a plurality of piezo-electric crystals located within said ring-shaped metallic container, and means external of said casing for connecting in electrical circuit said electron discharge device and at least one of said crystals.

8. An oscillation crystal arrangement comprising an insulated casing, a contact thermometer within said casing for electrically controlling a heating winding within said casing to control its temperature, an electron discharge device located in the central portion of said casing, a ring-shaped metallic container within said casing, a plurality of piezo-electric crystals located within said ring-shaped metallic container, and means external of said casing for connecting in electrical circuit said electron discharge device and at least one of said crystals.

WILHELM SCHNEIDER.